US010261810B2

(12) United States Patent
McCourtney et al.

(10) Patent No.: US 10,261,810 B2
(45) Date of Patent: Apr. 16, 2019

(54) SYSTEM AND METHOD FOR PROVIDING CLOUD OPERATING SYSTEM VALIDATIONS FOR A DOMAIN-SPECIFIC LANGUAGE FOR CLOUD SERVICES INFRASTRUCTURE

(71) Applicant: FUGUE, INC., Frederick, MD (US)

(72) Inventors: Nathaniel S McCourtney, Frederick, MD (US); Jasper Van Der Jeugt, Zurich (CH); Maciej Wos, Hong Kong (CN)

(73) Assignee: FUGUE, INC., Frederick, MD (US)

( * ) Notice: Subject to any disclaimer, the term of this patent is extended or adjusted under 35 U.S.C. 154(b) by 0 days.

(21) Appl. No.: 15/893,215

(22) Filed: Feb. 9, 2018

(65) Prior Publication Data

US 2018/0246738 A1 Aug. 30, 2018

Related U.S. Application Data

(60) Provisional application No. 62/457,721, filed on Feb. 10, 2017, provisional application No. 62/544,537, filed on Aug. 11, 2017.

(51) Int. Cl.
*H04L 29/08* (2006.01)
*H04L 29/06* (2006.01)
(Continued)

(52) U.S. Cl.
CPC ............ *G06F 9/44589* (2013.01); *G06F 8/31* (2013.01); *G06F 8/35* (2013.01); *G06F 8/40* (2013.01);
(Continued)

(58) Field of Classification Search
CPC ..... H04L 67/10; H04L 63/20; H04L 63/0815; H04L 63/10; H04L 63/102; G06F 9/5072;
(Continued)

(56) References Cited

U.S. PATENT DOCUMENTS 8,638,674 B2 * 1/2014 Nugent ................... H04L 67/10
370/242
9,106,584 B2 * 8/2015 Mao ..................... H04L 41/5009
(Continued)

OTHER PUBLICATIONS

M. Kramer, Controlling the Processing of Smart City Data in the Cloud with Domain-Specific Languages, 6 pages (Year: 2014).*
(Continued)

*Primary Examiner* — Thuy Dao
(74) *Attorney, Agent, or Firm* — Morrison & Foerster LLP

(57) ABSTRACT

A system and method for providing and executing a domain-specific programming language for cloud services infrastructure is provided. The system may be used to integrate references to external entities, such as cloud service compute instances, directly into a domain-specific programming language, allowing developers to easily integrate cloud services directly using the domain-specific programming language. A compiler stored within a cloud operating system can include one or more validations that can check instantiations of types within the domain-specific language for compliance with one or more policies set by a system administrator of a computing enterprise.

22 Claims, 10 Drawing Sheets

(51) Int. Cl.

| | |
|---|---|
| *G06F 9/445* | (2018.01) |
| *H04L 12/24* | (2006.01) |
| *G06F 8/30* | (2018.01) |
| *G06F 8/35* | (2018.01) |
| *G06F 9/455* | (2018.01) |
| *G06F 9/50* | (2006.01) |
| *G06F 8/40* | (2018.01) |
| *G06F 8/41* | (2018.01) |
| *G06F 21/57* | (2013.01) |

(52) U.S. Cl.
CPC .......... *G06F 8/437* (2013.01); *G06F 9/45512* (2013.01); *G06F 9/5072* (2013.01); *G06F 21/577* (2013.01); *G06F 2221/033* (2013.01)

(58) Field of Classification Search
CPC .... G06F 9/44589; G06F 9/45512; G06F 8/31; G06F 8/35; G06F 8/65; G06F 8/40; G06F 8/437
See application file for complete search history.

(56) References Cited

U.S. PATENT DOCUMENTS

| | | | | |
|---|---|---|---|---|
| 9,838,376 B1* | 12/2017 | Lander | ................ | H04L 63/0815 |
| 9,843,624 B1* | 12/2017 | Taaghol | ................ | H04L 67/10 |
| 2003/0056192 A1 | 3/2003 | Burgess | | |
| 2012/0150939 A1 | 6/2012 | Zaifman et al. | | |
| 2013/0152047 A1 | 6/2013 | Moorthi et al. | | |
| 2013/0275958 A1 | 10/2013 | Ivanov et al. | | |
| 2014/0013315 A1 | 1/2014 | Genevski et al. | | |
| 2014/0068340 A1 | 3/2014 | Dayal et al. | | |
| 2014/0100912 A1* | 4/2014 | Bursey | .................. | H04W 4/70 |
| | | | | 705/7.27 |
| 2014/0101631 A1 | 4/2014 | Hughes | | |
| 2014/0258513 A1 | 9/2014 | Letca et al. | | |
| 2015/0378700 A1* | 12/2015 | Rachamadugu | .......... | G06F 8/60 |
| | | | | 717/120 |
| 2016/0094483 A1 | 3/2016 | Johnston et al. | | |
| 2016/0139895 A1* | 5/2016 | Stella | ........................ | G06F 8/44 |
| | | | | 717/147 |
| 2017/0302531 A1* | 10/2017 | Maes | ..................... | H04L 41/12 |

OTHER PUBLICATIONS

Amazon. (Dec. 19, 2013) "Welcome-Amazon Elastic Compute Cloud". (1 page).

Anderson. (Nov. 6, 2015) "Chef launches Compliance: Server security policy as code" located at https://www.theregister.co.uk/2015/11/06/chef_launches_compliance_policy_as_code/ visited May 16, 2018. (3 pages).

International Search Report and Written Opinion dated Feb. 2, 2016, directed to PCT Application No. PCT/US2015/060728; 8 pages.

International Search Report and Written Opinion dated May 25, 2018, directed to PCT Application No. PCT/US2018/017684; 14 pages.

Stella et al. (Oct. 11, 2016), "Why We Built Ludwig—a DSL for the Cloud of Today and the Future" located at https://blog.fugue.co/2016-10-11-why-we-builty-ludwig.html visited May 15, 2018. (4 pages.).

Stella et al., U.S. Office Action dated Dec. 6, 2017, directed to U.S. Appl. No. 14/941,345; 33 pages.

Stella et al., U.S. Office Action dated Jan. 11, 2017, directed to U.S. Appl. No. 14/941,345; 35 pages.

Stella et al., U.S. Office Action dated Jun. 16, 2017, directed to U.S. Appl. No. 14/941,345; 29 pages.

Stella et al., U.S. Office Action dated May 24, 2018, directed to U.S. Appl. No. 14/941,345; 32 pages.

Tao. (Dec. 11, 2009) "Combining Cloud and Grid with a User Interface" (17 pages.).

* cited by examiner

SYSTEM AND METHOD FOR PROVIDING CLOUD OPERATING SYSTEM VALIDATIONS FOR A DOMAIN-SPECIFIC LANGUAGE FOR CLOUD SERVICES INFRASTRUCTURE

CROSS-REFERENCE TO RELATED APPLICATIONS

This application claims the benefit of U.S. Provisional Application Nos. 62/457,721, filed Feb. 10, 2017, and 62/544,537, filed Aug. 11, 2017, the entire contents of which are incorporated herein by reference.

FIELD OF THE DISCLOSURE

The invention relates to a system and method for providing and executing a domain-specific programming language for cloud services infrastructure.

BACKGROUND OF THE INVENTION

A number of cloud service providers sell various cloud services to execute compute instances on behalf of their customers. For example, AMAZON sells its AMAZON WEB SERVICES (AWS) service, GOOGLE sells its GOOGLE APP ENGINE service, and others sell similar services. In exchange for a fee, AMAZON, GOOGLE, and other cloud service providers provide the use of their servers and other infrastructure to customers for a limited time in the form of a cloud service instance. The fee may vary depending on a time/date that the cloud service instance is to be run, a performance of the cloud service instance (e.g., throughput, latency, etc.), whether the offered cloud service instance is a spot instance or a standard instance, and/or other attributes.

Integrating use of cloud services into an organization's processes can be difficult. Conventionally, users can manually enter an input into a cloud services command line interface (CLI) or graphical user interface (GUI). Making the process of creating cloud infrastructure more user friendly can be achieved through the use of specialized programs in conventional programming languages that attempt to instantiate, monitor, and update cloud instances.

Often times, an organization may employ multiple developers to build and maintain the computing infrastructure of the organization. These multiple developers can simultaneously build and maintain portions of an organization's computing infrastructure, however the organization can have an interest in ensuring that each of these developers comply with organization wide policies with respect to how they are building and maintaining the computing infrastructure.

Furthermore, malicious users (i.e., users who wish to harm the organization's computing infrastructure in some manner) can attempt to subvert the organization wide policies in some way, either by bypassing the validation process in some manner, or altering the validation process in a manner so that any attacks generated by the malicious user may go undetected.

SUMMARY OF THE DISCLOSURE

Accordingly, the following disclosure is related to a domain specific language for cloud services infrastructure which allows for a user to create a computing environment using a user-friendly syntax that can be converted into code that is readable by a cloud computing services provider.

In one example, the user-generated code (that can include declarations of computing infrastructure) can be compiled and converted into a file that is executable by a cloud operating system. The executable code along with the original user-generated code can be transmitted to the cloud operating system. A compiler stored within the cloud operating system can check the declarations of computing infrastructure located within the received code against a state information service that can determine if the declared infrastructure exists on the cloud service provider, and if the declared infrastructure is in scope with what is provided by the cloud service provider.

In another example, an organization can provide a validation library that when utilized, can check user-generated code for compliance with policies that are enumerated within the validation library. When a user provides code to build infrastructure on a cloud service provider, the user-generated code can be checked against the policies enumerated in the validation library to determine if the user-generated code is in compliance with one or more policies. If the user-generated code is not in compliance with the one or more policies, then the validation library can be configured to ensure that the user-generated code is not allowed to be compiled and converted into an executable function that can be executed on a cloud computing operating system. In this way, a user can be prevented from building or maintaining infrastructure on the cloud that is not in compliance with an organization's policies.

In another example, when the user-generated code and the executable file transmitted by the client device to the cloud operating system is received, the cloud operating system can perform its own validations on that code and can determine if the received user-generated code is in compliance with an organization's policies. If the code is found to be in compliance, the cloud operating system can then generate another executable file based on the received user-generated code. The cloud operating system can then compare the originally received executable file with the newly generated executable file. If the two executable are found to substantially match one another then the cloud operating system can execute the newly generated executable code. If however, the newly generated executable file is found to not substantially match the originally received executable file, then the newly generated executable file can be prevented from being processed by the cloud operating system.

DETAILED DESCRIPTION OF THE INVENTION

Figure 1:
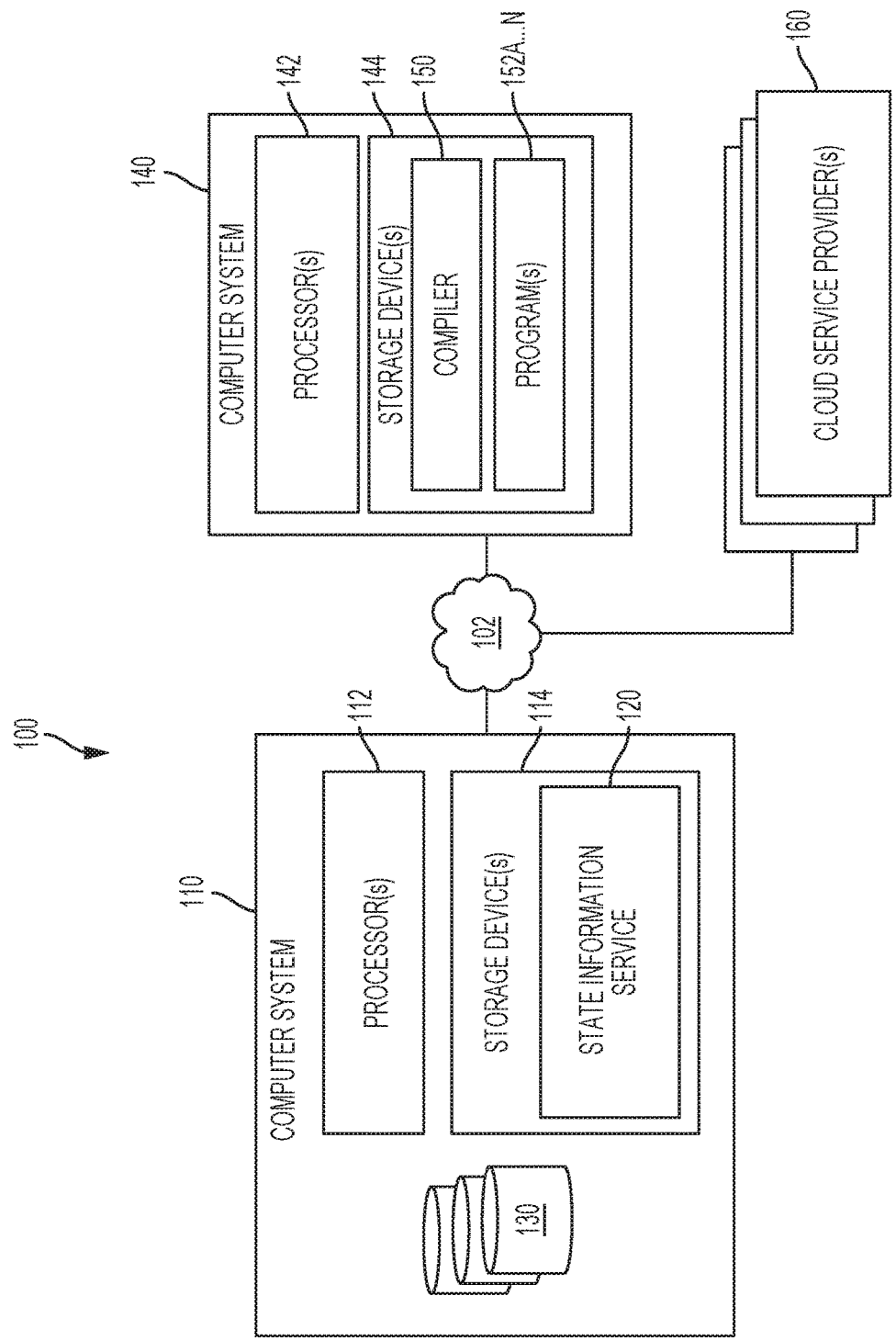
FIG. 1 illustrates a system of providing and executing a domain-specific programming language for cloud services infrastructure, according to examples of the disclosure.

FIG. 1 illustrates a system 100 of providing and executing a domain-specific programming language for cloud services infrastructure (hereinafter, "domain-specific programming language" for convenience), according to an implementation of the invention. The system may be used to integrate references to external entities, such as cloud service compute instances, directly into a domain-specific programming language, allowing developers to easily integrate cloud services directly using the domain-specific programming language.

For illustration and not limitation, the external entities will be described as cloud compute instances (e.g., compute instances executed at a computer operated by a cloud service provider) that may be referenced directly within the domain-specific programming language described herein. However, other external entities (e.g., external to a given memory of a computer device that executes code that uses the domain-specific programming language described herein) may be used as well. As an example, the external entities can include DNS entries, binary objects, shared queues, database tables, etc.

The system may be used to facilitate checking against the type and state of an external entity in the language itself, including at authoring, build and run times. Furthermore, the system may facilitate compilation, type checking and debugging while authoring programs against external entities as opposed to requiring testing to be performed to find errors and bugs.

Language Primitives that are References to Infrastructure or Other External Entities Typically, in a programming language, a variable may be resolved to an address in memory at runtime. For example, if one were to define my-thing=123456, this would put the value 123456 to a location in memory. After definition, any code using my-thing would either get a reference to that memory address or would receive a copy of the value.

Using the domain-specific programming language described herein, references to external entities (not in memory) as variables may be used. For example, by defining mything=this-instance, this-instance would be resolved to a URL or other identifier of a running virtual computer, as opposed to an address in memory. This allows for checking against the type and state of an external entity in the language itself, including at authoring, build and run times. The reference may be set by another program, manual configuration (e.g., at compile time), and/or other processes. By using language primitives that are references to cloud services infrastructure, the system facilitates checking, at compile and debug time, for the legitimacy of the reference, and to have a valid reference at runtime. Computing infrastructure can refer to components within a computing system that are being provided by a cloud service rather than having to use physical on-site devices. For instance computing infrastructure can refer to computing devices such as virtual machines, load balancers, virtual networks, data storage services, domain name services, disk imagers, containers, clusters, and lambda instructions. These examples are not meant to be limiting, and are only provided as examples. The domain-specific programming language further facilitates compilation, type checking and debugging while authoring programs against external entities as opposed to requiring testing to be performed to find errors and bugs.

Lexical Scoping that Maps to Abstractions of External Entities

In typical programming languages, lexical scoping is a way to organize pieces of code such that names can be re-used and also to allow for segmentation and encapsulation of elements of the program. For example, a private field in an Object-Oriented language prevents direct access to that data from outside the instance of the Class in which it is defined.

Using the domain-specific programming language described herein, lexical scoping may be mapped onto collections of entities that aren't a native part of the language. For example, a compute instance may be defined using the reference to external entity method described above: my-thing=this-instance, where this instance is a pointer to an actual entity in the runtime environment.

Using external entity lexical scoping, the system may make this-instance a child of this venue, where this-venue may include an arbitrary collection of entities. If this-instance was not public to the scope of the calling code, the compiler would return an error when directly referencing. This may occur when, for example, the scope of a variable was limited to a particular set of entities. The external entity may be associated with a single cloud service provider or different cloud service providers, the identification of which may be associated with a given variable or reference.

Externalizing the Language Runtime State Information to a Service

In order to facilitate these and other benefits, the system may maintain state information of all references and shared variables across program boundaries. The system may make the state information accessible via a state information service that understands the language features of the domain-specific programming language.

At compile time, the compiled code can be processed by an interpreter module of the run-time environment (explained in detail below) that may query the state information service to identify a variable in scope to the use in the language in order to determine if it exists, and, if so, whether it is in scope to reference. The state information service may also deliver details on how the entity may be used, such as available functions or operations.

The state information service may keep detailed version information on the state of the variable. For example, if user A creates an entity via compiling and running a program, a corresponding variable may appear in the state information service, along with a serial number (or other version information) set to 1. In some examples, the corresponding variable can be a unique hash derived from the computing infrastructure's instance in the program. During the normal operations of the entity, its state changes (e.g., to another Internet Protocol address). A second program that initiates the change may update the table with the new IP address, and may increment the serial number to 2. When a third program references the entity, and has a version 1 understanding of the state, it sees that the new serial number is 2 and may query the state information service for the latest version.

The state information may be made generic and scoped across all the entities the organization wishes to have available. In this way, multiple users across many parts of an organization may interoperate with the products of their peers in other teams dynamically.

Other uses of system 100 are described herein and still others will be apparent to those having skill in the art. Having described a high level overview of some of the system functions, attention will now be turned to various system components that facilitate these and other functions.

The above infrastructure primitives and the lexical scoping applied to them, as discussed above, can be used to create functions that can yield patterns of infrastructure based on certain arguments inputted into those functions. The code example provided below, is an example of an enumeration type:

Type IcmpDescription:
|Ping
|DestinationUnreachable
|RedirectMessage

The code example provided below, is an example of a data structure type that can define the properties of an "icmp." In the example below, the icmp type has the property values "type" and "code" and these properties are expressed as integers.

Type Icmp:
|type: INT
|code: INT

The code example below, illustrates an example function using the domain specific language. The example code below taken a infrastructure description and evaluates to an icmp (machine data).

Icmp fromDescription(IcmpDescription icmp):

```
Case icmp of
 | ping                   {code: 0, type: 0}
 | DestinationUnreachable {code: 0, type: 3}
 | Redirect Message       {code: 0, type: 5}
```

The above functions can be evaluated at compile time by the explain function described in further detail below.

Exemplary System Architecture

System 100 may include a computer system 110, a computer system 140, one or more cloud service providers 150, and/or other components.

Computer System 110

Computer system 110 may include one or more processors 112 (also interchangeably referred to herein as processors 112, processor(s) 112, or processor 112 for convenience), one or more storage devices 114 (which may store a state information service 120, hereinafter SIS 120 for convenience), one or more entity state information databases 130, and/or other components. Processors 112 may be programmed by one or more computer program instructions. For example, processors 112 may be programmed by SIS 120 and/or other instructions.

Computer System 140

Computer system(s) 140 may each include one or more processors 142 (also interchangeably referred to herein as processors 142, processor(s) 142, or processor 142 for convenience), one or more storage devices 144 (which may store a compiler 150A, one or more programs 152, and/or other instructions), and/or other components. Processors 142 may be programmed by one or more computer program instructions. For example, processors 142 may be programmed by compiler 150, programs 152, and/or other instructions.

Cloud Service Providers 160

Cloud service providers 160 may include entities that sell various cloud services to execute compute instances on behalf of their customers. For example, AMAZON sells cloud service instances using its AMAZON WEB SERVICES (AWS) service, and GOOGLE sells cloud service instances using its GOOGLE APP ENGINE service. In other examples, cloud service providers can also include other specialized providers who provide non-compute services such as content delivery networks, domain name service, etc.

Cloud service providers 160 may also include entities that provide markets, or exchanges, for cloud services. For example, cloud service providers 160 may include markets that sell cloud service instances on behalf of others that actually provide the cloud service instances using their infrastructure. In this manner, system 100 may leverage exchanges that may sell various cloud service instances from different entities.

Although illustrated in FIG. 1 as a single component, computer system 110 and computer system 140 may each include a plurality of individual components (e.g., computer devices) each programmed with at least some of the functions described herein. In this manner, some components of computer system 110 and/or customer computer system 140 may perform some functions while other components may perform other functions, as would be appreciated. The one or more processors 112, 142 may each include one or more physical processors that are programmed by computer program instructions. The various instructions described herein are exemplary only. Other configurations and numbers of instructions may be used, so long as the processor(s) 112, 142 are programmed to perform the functions described herein.

Furthermore, it should be appreciated that although the various instructions are illustrated in FIG. 1 as being co-located within a single processing unit, in implementations in which processor(s) 112, 142 includes multiple processing units, one or more instructions may be executed remotely from the other instructions. In addition, at least some of the functions described herein with respect to processor(s) 112 may be performed by processor(s) 142, and vice versa. For example, processor(s) 112 may be programmed by compiler 150, programs 152, and/or execute a runtime environment for programs 152. Likewise, processor(s) 142 may be programmed with state information service 120.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The entity state information database 130 (and/or any other database) described herein may be, include, or interface to, for example, an Oracle™ relational database sold commercially by Oracle Corporation. The example database provided above is not meant to be limiting and the entity state information database 130 could include, or be interfaced to other databases, such as Informix™, DB2 (Database 2), Amazon DynamoDB™ or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary System Processing Operations

Figure 2:
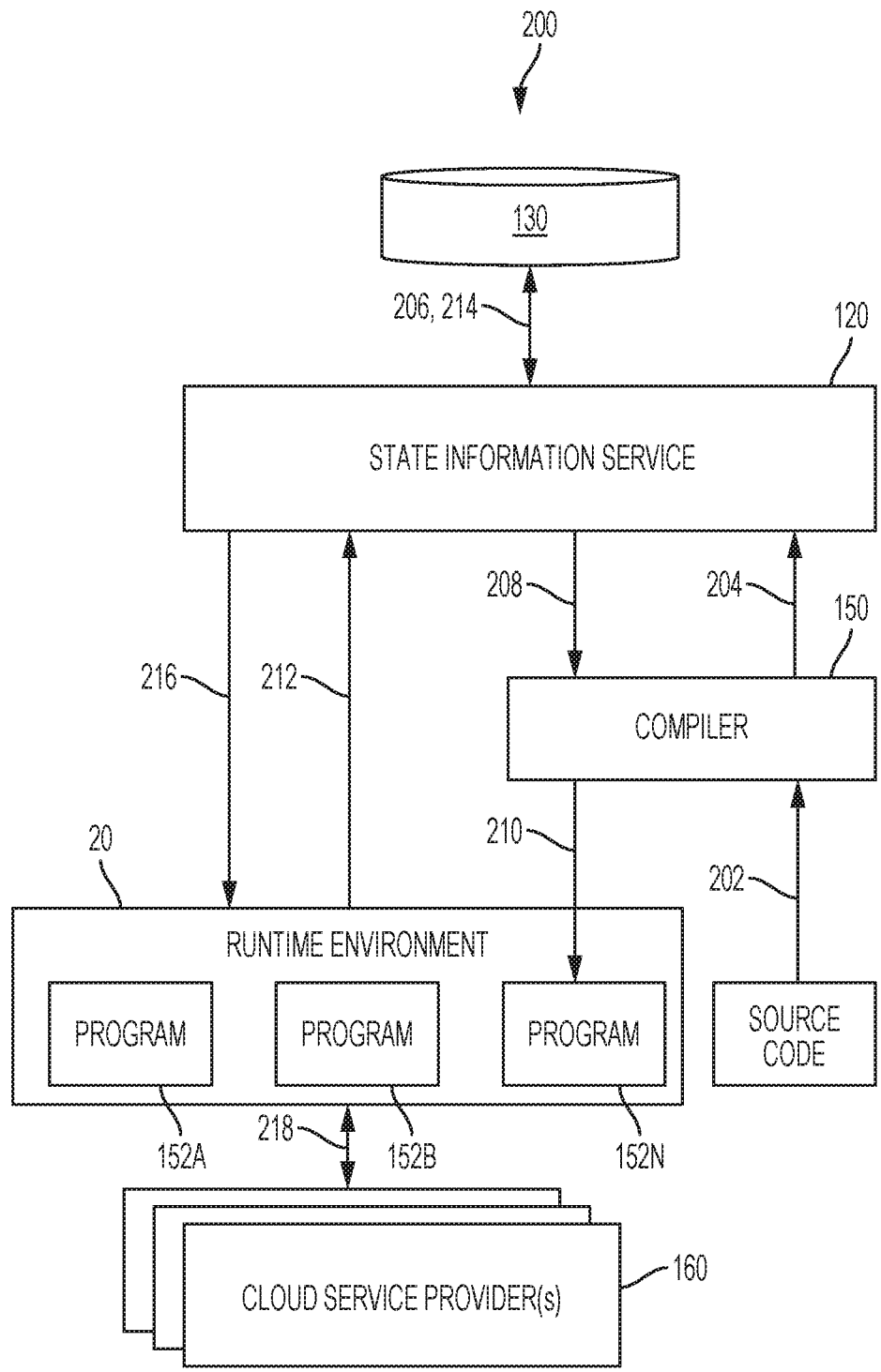
FIG. 2 illustrates a process flow diagram of various system components for providing and executing a domain-specific programming language for cloud services infrastructure, according to examples of the disclosure.

FIG. 2 depicts a process flow diagram 200 of various system components for providing and executing a domain-specific programming language for cloud services infrastructure, according to an implementation of the invention. The various processing operations and/or data flows depicted in FIG. 2 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, source code in the domain-specific programming language for cloud services infrastructure may be received. For example, a developer may draft the source code to be received and compiled by compiler 150.

The compiled code generated by compiler 150 may be sent to the run-time environment 20, in which an explain action can be initiated (described further below) and a query can be sent to SIS 120 to identify a variable in scope to the use in the source code to determine whether the variable exists, and, if so, whether the variable is in scope to the reference.

In an operation 206, SIS 120 may query entity state information database 130 to obtain the state information for the variable and/or the reference.

SIS 120 may obtain and provide any relevant state information (which may indicate an existence of the variable, its scope, a reference to an external entity such as a compute instance provided by cloud service provider 150, how an entity may be used such as its available functions, etc.) to the other components in the run-time environment (or return NULL or other indication that the variable does not exist).

In an operation 210, compiler 150 may generate an executable program (hereinafter referred to as program 152A for convenience) if the variable exists and is in scope based on the state information. Program 152A may be placed run in runtime environment 20, along with other programs (152B, . . . , N) that have been compiled by compiler 150. The run-time environment is discussed in detail below with respect to FIG. 3.

In an operation 212, runtime environment 20 may execute program 152B. For example, program 152B may be called to run in runtime environment 20 by a human user, a process, and/or other user. Runtime environment 20 may query SIS 120 to identify a variable in scope to the use in the program 152B to determine whether the variable exists, and, if so, whether the variable is in scope to the reference. For example, runtime environment 20 may transmit the query via network 102 to SIS 120.

In an operation 214, SIS 120 may query entity state information database 130, as described with respect to operation 206.

In an operation 216, SIS 120 may obtain and provide any relevant state information to runtime environment 20, as described before with respect to operation 208. Runtime environment may cause an error (e.g., a runtime fault) to occur if a given variable is not in scope to the calling compiled code (program 152B). Otherwise, runtime environment 20 may obtain a current state of a given variable in program 152B at the time of execution so that any state changes related to a referenced entity (e.g., compute instance executing at a cloud service provider 160) may be accounted for during execution of program 152B.

In an exemplary operation of programs in runtime environment 20, a user may compile and execute program 152A, which may include a variable that references an entity and causes the entity to be created. For example, the created entity may include, without limitation, a compute instance at cloud service provider 160. In other words, using the domain-specific language described herein, instantiation of a variable may refer to, and cause to be created, a corresponding compute instance. In an implementation, the source code for program 152A may specify/define the cloud instance to which the variable is referenced or the cloud instance may be defined by a configurable parameter setting. Upon compilation, SIS 120 may store the variable, its reference, its state, how the compute instance may be used, and/or other state information using entity state information database 130.

Program 152B may also include the variable. When program 152B is compiled, an explain action can be executed in the run-time environment (explained in further detail below) that may query SIS 120 to determine whether the variable is in-scope to program 152B. Likewise, when program 152B is run, runtime environment 20 may query SIS 120 to determine whether the variable is in-scope as well as obtain current state information related to the variable.

In some instances, program 152B may cause the variable to be updated. For example, program 152B may cause a replacement compute instance to replace the existing compute instance at cloud service provider 160, causing an addressable identifier (e.g., an Internet Protocol address) to be changed to refer to the replacement computer instance. Responsive to such change, runtime environment 20 may provide SIS 120 with the update, which may update entity state information database 130 with the updated information for the variable. In another example, changes to instances of computing infrastructure (i.e., variables) initiated by an external actor (such as a user manually operating the cloud computing environment interface can be reverted back to its original form, it is found that the altered form does not conform to the original instance of the computing instance specified by the user through the domain specific programming language.

Program 152N may also include the variable. Variables from program 152N may be validated at compile and runtime, as described above. Program 152N, when executed, may obtain the current state information related to the variable. For instance, instead of a reference to a compute instance created by program 152A (which may have cause the compute instance to be created), a variable included in program 152N may reference the current compute instance, as updated by program 152B. In this manner, different programs may update the same variable, which may cause references for those variables to be updated as well. Using the domain-specific language described herein, different developers may therefore refer to different entities (such as compute instances at cloud service providers 160) natively within the language of the code.

Figure 3:
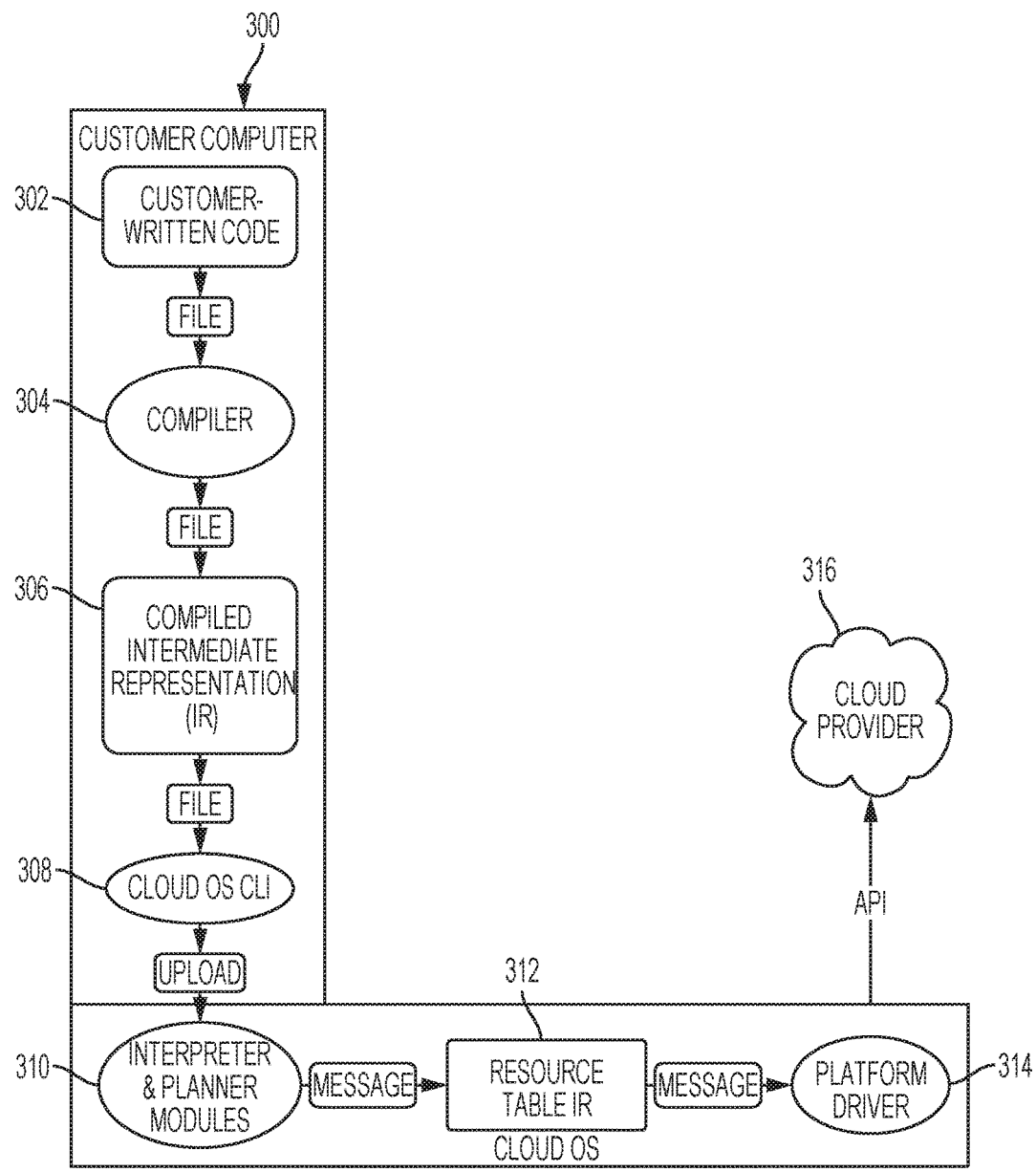
FIG. 3 illustrates an exemplary runtime environment of a compiled domain specific programming language for cloud services infrastructure, according to examples of the disclosure.

FIG. 3 illustrates an exemplary run-time environment of a compiled domain-specific programming language for cloud services infrastructure, according to examples of the disclosure. As illustrated in FIG. 3, at the customer/client computer 300, a user can compose computer code using a domain-specific programming language that specifies computing infrastructure to implement on a cloud-based computing service.

Once a user has generated the code, the code is compiled at step 304, wherein it is converted from a user-friendly syntax generated by the user into an intermediate representation (illustrated at step 306) that can be understood by the command line interface of an infrastructure operating system. At step 308, the infrastructure operating system can execute the compiled code 306 by building and tracking what the code declares.

The code can then be sent to the interpreter and planner modules 310 that convert the command line interface language (i.e., intermediate representation 306) into a series of specific instructions that can executed by the infrastructure operating system. In one example the interpreter manager can use one or more planning modules to build the instructions. The interpreter manager can achieve this by employing a series of planning modules that accept, in some examples, resource tables at its input and generates resource tables in which any omissions in the syntax provided by the user are filled in. In one example, the planning modules can receive a resource table that specifies properties of the computing infrastructure to be built. The interpreter manager can review a resource table sent by the user (in the form of compiled domain specific code and send it to the series of planning modules based on what infrastructure needs have been declared by the user.

The planning modules alter the user's resource table and return it to the interpreter manager. This process may be repeated with other planning modules until the final correct version of the resource table is complete at step 312. The interpreter manager then converts the resource table into a machine instruction file which can be referred to as a low level declaration of the computer infrastructure to be built on the cloud. The low level declaration is then sent to the builder/driver 314 wherein the resource table is converted into a language that can be interfaced with the application program interface of a cloud provider 316.

As part of its operation, the interpreter and planner modules 310 can input the user declared instances of computing infrastructure, as well as the scope of those declared instances, generated by the user in the domain specific computing language. The interpreter can query an external state information service database (discussed above) to determine if the type of computing instance declared by the user exists, and if so, the state information service can provide any relevant state information to the interpreter.

Once the computing infrastructure has been built on the cloud computing environment, the implemented infrastructure can be "persisted" which means that the implemented infrastructure can be compared against the user's originally declared instance of the computing infrastructure as expressed in the domain-specific programming language. If any differences are found, the implementation of the computing infrastructure can be modified by the interpreter 310, so that the implementation of the infrastructure on the cloud matches the user's desired infrastructure.

Figure 4:
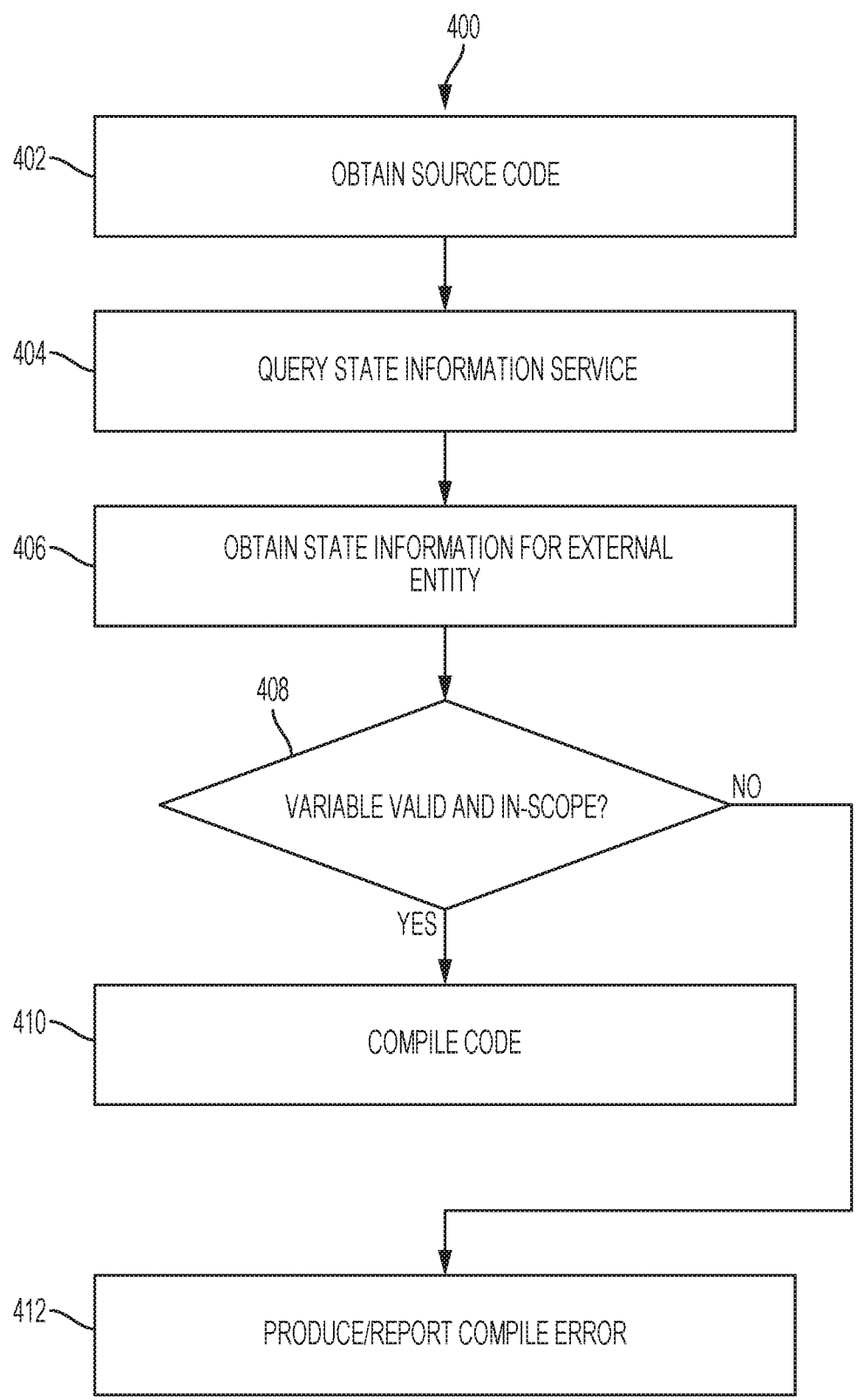
FIG. 4 illustrates a process of compiling a domain-specific programming language for cloud services infrastructure, according to examples of the disclosure.

FIG. 4 illustrates a process 400 of compiling a domain-specific programming language for cloud services infrastructure, according to an implementation of the invention. The various processing operations and/or data flows depicted in FIG. 4 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, source code in a domain-specific programming language may be obtained.

In an operation 404, a state information service may be queried to identify a variable in scope to the use in the language in order to determine if it exists, and, if so, whether it is in scope to reference. Operation 404 may be repeated, as necessary, for variables that appear in the source code. As discussed above, the state information service may be queried during an explain action (explained in detail below) in which an interpreter located in the run-time environment can query the state information service to determine if the variable exists, and if so, whether it is in scope to how it is referenced in the user generated code.

In an operation 406, state information: may be obtained based on the query.

In an operation 408, a determination of whether a variable exists and/or is in scope may be determined.

In an operation 410, responsive to a determination that the variable exists and is in scope, the source code may be transmitted to the run-time environment for implementation on the cloud service.

In an operation 412, responsive to a determination that the variable does not exist or is not in scope, a compile error may occur and be communicated.

Figure 5:
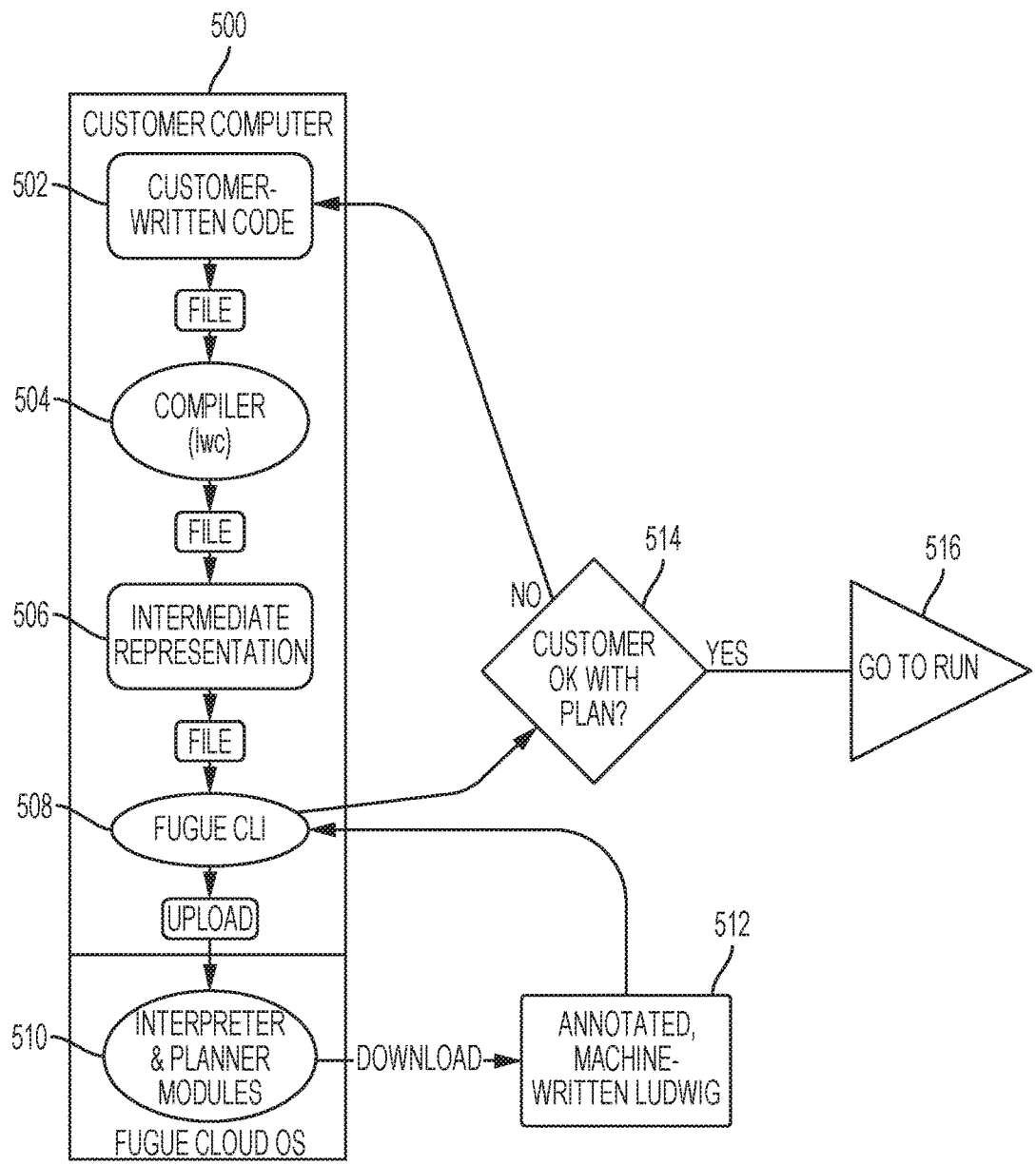
FIG. 5 illustrates an exemplary explain process according to examples of the disclosure.

FIG. 5 illustrates an exemplary explain process according to examples of the disclosure. In the explain action illustrated in FIG. 5, steps 502, 504, 506, 508, and 510 operate in substantially the same way as their counterparts in FIG. 3 (i.e., steps 302, 304, 306, 308, and 310 respectively). However, in contrast to the process illustrated in FIG. 3, rather than converting the resource table generated by the interpreter into a machine instruction file, instead at step 512 the process returns the annotated resource table to the infrastructure operating system CLI 508.

As discussed above, as part of its operation, the interpreter can input the user declared instances of computing infrastructure, and query a state information service database to determine if they exist. If it is determined that the instance of computing infrastructure does not exist, then the state information service can indicate to the interpreter that the declared instance does not exist and the use can be notified at step 512.

If however all the declared variables exist, the user can be presented with a plan for how the infrastructure is to be implemented at step 514. At step 514 the user can determine if the received implementation plan is acceptable, and if so, the process can move to step 516 wherein the annotated coded produced at step 512 is converted into machine code that is compatible with the command line interface of a cloud computing services provider.

Figure 6:
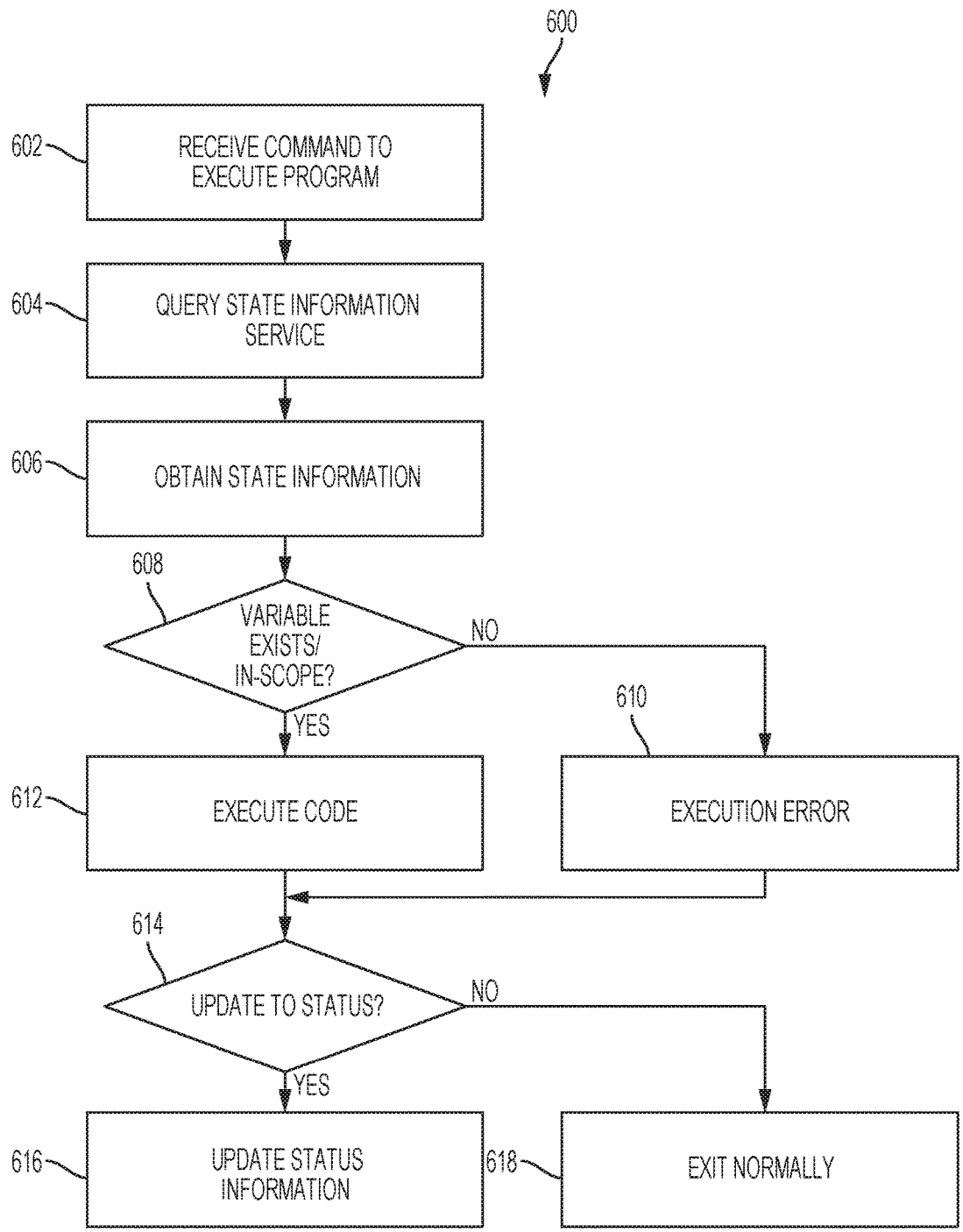
FIG. 6 illustrates an exemplary process of executing a domain-specific programming language for cloud services infrastructure, according to examples of the disclosure.

FIG. 6 illustrates a process 600 of executing a domain-specific programming language for cloud services infrastructure, according to an implementation of the invention. The various processing operations and/or data flows depicted in FIG. 6 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a command to execute a program compiled from source code using the domain-specific programming language may be received.

In an operation 604, a state information service may be queried to identify a variable in scope to the use in the language in order to determine if it exists, and, if so, whether it is in scope to reference. Operation 604 may be repeated, as necessary, for variables that appear in the source code.

In an operation 606, state information may be obtained based on the query.

In an operation 608, a determination of whether a variable exists and/or is in scope may be determined.

In an operation 610, responsive to a determination that the variable does not exist or is not in scope, a runtime error may occur and be communicated.

In an operation 612, responsive to a determination that the variable exists and is in scope, the program may be executed. Operation 612 may be repeated until all variables have been processed. In some implementations, execution of the code may cause a compute instance at a cloud service provider to be instantiated. In these implementations, state information (e.g., IP address, version, how used, etc.) may be stored via a state information service. In this manner, other programs that use the same variable may access the state information for the instantiated compute instance.

In an operation 614, a determination of whether an update to state information of an entity associated with a variable occurred during execution of the program may be made. For example, a program that uses a variable corresponding to a compute instance may have changed an IP address associated with the compute instance. Operation 614 may be repeated until all variables have been processed.

Responsive to a determination that an update occurred, in an operation 416, the state information may be updated via a state information service.

In an operation 618, code execution may terminate normally (e.g., without error conditions).

The domain-specific language described above can use one or more libraries to aid in the development of software. A library can include a collection of resources used by computer programs (such as those written in a domain-specific language) to allow for the development of software using the domain-specific language. Libraries can include configuration data, documentation, help data, message templates, pre-written code, subroutines, classes, values, type specifications.

Library code can be organized in such a way that it can be used by multiple programs that have no connection to one another. In other words, even if multiple users generate different programs using a coding language, by invoking a common library, each individual user-generated can use sub-routines and sub-programs that are contained within the library.

Therefore, in one example, a cloud computing infrastructure type can be invoked by a user-generated program, but the definition of that type can be stored in a library, so that any program which instantiates the type can use the code contained with the library to define the type.

The utility of libraries in a programming language can be utilized to enforce system policies on user-generated code developed in the domain-specific language. In one example, if a business or other enterprise wishes to ensure that computing infrastructure built on a cloud by the use of a domain-specific language complies with one or more policies of the enterprise with respect to computing infrastructure, they may utilize a validations library that when invoked will check the user-generated code to ensure that it complies with the desired policies. If the code does comply with the policies, then the code is allowed to compile and the computing infrastructure is built using the user-generated code. On the other hand, if the user-generated code does not comply with the enterprise's policies, the compiling of the code can be prevented and the user can be notified of the reason why the code was not allowed to be compiled.

In this way, the enterprise is able to allow for multiple individuals to build and maintain the enterprise's computing infrastructure via the cloud service provider, while at the same time ensuring that each and every instance of computing infrastructure built on behalf of the enterprise complies with the enterprise's self-defined policies.

A domain-specific language (and, by extension, a cloud operating system) can have the ability to add assertions to code that cause a compiler failure when the code it's related to does not meet its standards. That feature of the language can be known as Validations.

An administrator of the domain-specific language can write Validations and attach them to the Types affected with the keyword "validate," in one example. Once the Types within the domain-specific language are attached, every time code written in the domain-specific language is compiled, it can check the user-generated code against the validations. This can happen locally on a domain-specific programming language author's desktop or on the cloud operating system, where validations are enforced against running infrastructure.

To illustrate the method of validation described above, an example is provided below. In the example, an enterprise wishes to enforce a policy wherein they desire to construct T types that only have the string "test" within them. Thus, when a user generates T types in the following manner:

type T:
|T {value: String}

The code will only be compiled if the string value contains the string "test" within it. In order to enforce this policy, a Validation library can be employed wherein the validations are laid out within the library. For example, the code below can be an example module to write to the Validations Library that can be used to enforce the policy described above.

```
import Ludwig. Validation as .
check-t: fun(t):
    if String.equal(t.T.value, "test") then
        success
    else
        failure("chedk-t failed")
```

Wherein "Ludwig" can be a generic name for the domain-specific language, and wherein the function check-t can be the function within the Validations library that checks instantiations of the type T to determine if the policy of having them constructed only with the string "test" in them is followed.

The Validations library can then "register" the validations using the validate keyword: validate check-t. Once the validation has been registered, every time a T is constructed, the check-t validation function will be used to ensure that the instantiation of T contains the string "test" within it.

Another example is provided below. In the example below, the system administrator wishes to enforce a specific policy regarding the use of a type called "Apple." First, the system administrator can create a Validation for the type "Apple" using the following code:

```
import Fugue.System.Apple as Apple
import Ludwig. Validation as Validation
fun noProcessesInTheFugueAccount(rule: Apple.Rule) -> Validation:
    case rule.(Apple.Rule).action of
    | Apple.AccountAction action ->
        if action == Apple.AccountRunProcess then
            let msg: "The AccountRunProcess permission is not allowed in the
            fugue account."
            case rule.(Apple.Rule).subject of
            | Apple.AccountType account -> case account of
                            | Apple.AllAccounts ->
                                Validation.failure(msg)
                            | Apple.Account acct ->
if acct.accountId == "fugue-12345678" then
                                        Validation.failure(msg)
                                    else
                                        Validation.success
    |_-> Validation.success
    else Validation.success
|_           -> Validation.success
validate noProcessesInTheFugueAccount
```

In the above code, the system administrator can import a library called Fugue.System.Apple by inserting the line of code which reads as "import Fugue.System.Apple as Apple" which can include the definitions of the type Apple. The system administrator can also import the validations library by inserting the line of code which reads as "import Ludwig.Validation as Validation." Then the system administrator can proceed to define the validation function for type "Apple" by defining a function called "noProcessesInTheFugueAccount" as shown above. Finally, the system can register the validation provided above to the type "Apple" by inserting the line of code which reads as "validate noProcessesInTheFugueAccount."

Once the validation for the type "Apple" has been created by the system administrator, a user can use that validation to validate their own instantiations of the type Apple when generating their own code. An example of a user using the Apple validation is shown below:

```
import Fugue.System.Apple as Apple
import NoProcessesInFugueAccount
user1: Apple.User {userId: "user1"}
fugueAccount: Apple.Account {accountId: "fugue-12345678"}
devAccount: Apple.Account {accountId: "dev-12345678"}
runProcessRule: Apple.accountRules {
    principals: [user1],
    accounts: [
        fugueAccount,
        devAccount,
    ],
    actions: Apple.allAccountActions,
}
```

In the example above, the user can import the library called Fugue.System.Apple by inserting the line of code which reads as "import Fugue.System.Apple as Apple" which can include the definitions of the type Apple. The system administrator can also import the NoProccesesIn-Fugue library created by the system administrator as described above by inserting the line of code which reads as "import NoProcessesInFugueAccount." Once the appropriate libraries have been imported the user can define their own code as shown in the example above.

The validations (as defined by the system administrator) on the type Apple can be run by using the compiler normally. In this example below, the compiler can be run from the user's laptop or desktop (i.e., the client machine).

```
$ lwc Apple.lw
ludwig (evaluation error):
    "/opt/fugue/lib/Fugue/System/Apple.lw" (line 81, column 39):
    error:
      81|  L.map(fun(t): case t of (p, a) -> Rule{principal: p, subject:
AccountType(account), action: AccountAction(a) },
L.cartesian-product(principals, actions))
```

Failed Validations:
The AccountRunProcess permission is not allowed in the fugue account. (from NoProcessesInFugueAccount.noProcessesInTheFugueAccount) Stack trace:
In call to f at "/opt/fugue/lib/Ludwig/List.1w" (line 133, column 32)
In call to map at "/opt/fugue/lib/Fugue/System/Apple.1w" (line 81, column 5)
In call to singleAccountRules at "/opt/fugue/lib/Fugue/System/Apple.1w" (line 77, column 38)
In call to f at "/opt/fugue/lib/Ludwig/List.1w" (line 133, column 32)
In call to map at "/opt/fugue/lib/Fugue/System/Apple.1w" (line 77, column 24)
In call to accountRules at "Apple.1w" (line 9, column 17)
In this way, if the user's use of the type Apple is in compliance with the policy set by the system administrator in the validations library for the type Apple, then the user-generated code can compile normally. On the other hand, if the user' use of the of the type Apple is not in compliance with the policy set by the system administrator in the validations library for the type Apple, then the user-generated code may fail to compile, and the user will be notified of the compilation error. In one or more examples, in addition to determining if an individual component is in compliance with the policies expressed in the validations library, the system can enforce policies relating to the number of components that appear in a computing system. For instance if a user declares a policy that only ten "Apples" can be included in the computing system, and a developer tries to create a system that includes eleven apples, then the validation library can notify the user that they are not in compliance with the policies expressed in the validations library.

The validation methods described above can allow for a user wishing to build computing infrastructure on a cloud operating system to ensure that they are in compliance not only with the domain-specific languages syntax but also an organization's computing policy. There may be instances in which a user either purposefully or negligently fails to ensure that their code is in compliance with the computing policy. As an example, a user may negligently fail to include a call to the validations library within their user-generated code. In this case, while the code may compile (i.e., the declared infrastructure is all valid and within scope), nonetheless the code may never be audited to ensure it meets with the computing policies set forth by the organization.

In another example, a malicious user may purposefully subvert the validation process in order to create or alter a computing environment in a manner that would allow for the user to implant security vulnerabilities into the computing infrastructure. In such a case, an organization may not desire that the entire validation process take place on the client device, but rather move or replicate the validation process to the cloud operating system so as to ensure that any user-generated code is guaranteed to be validated against the organization's security/computing policy.

Thus, an organization may wish to move or replicate the validation process away from the client computer in which the user is generating the domain-specific language code, and migrate or copy it to the cloud operating system, wherein the organization rather than user can exert control over how the user-generated code is compiled, and what policies the code will be subject to. By moving or replicating the validation process at the cloud operating system, an organization can ensure that all user-generated code is uniformly validated and that all code submitted to the cloud operating system is in compliance with the organization's computing policies.

Figure 7:
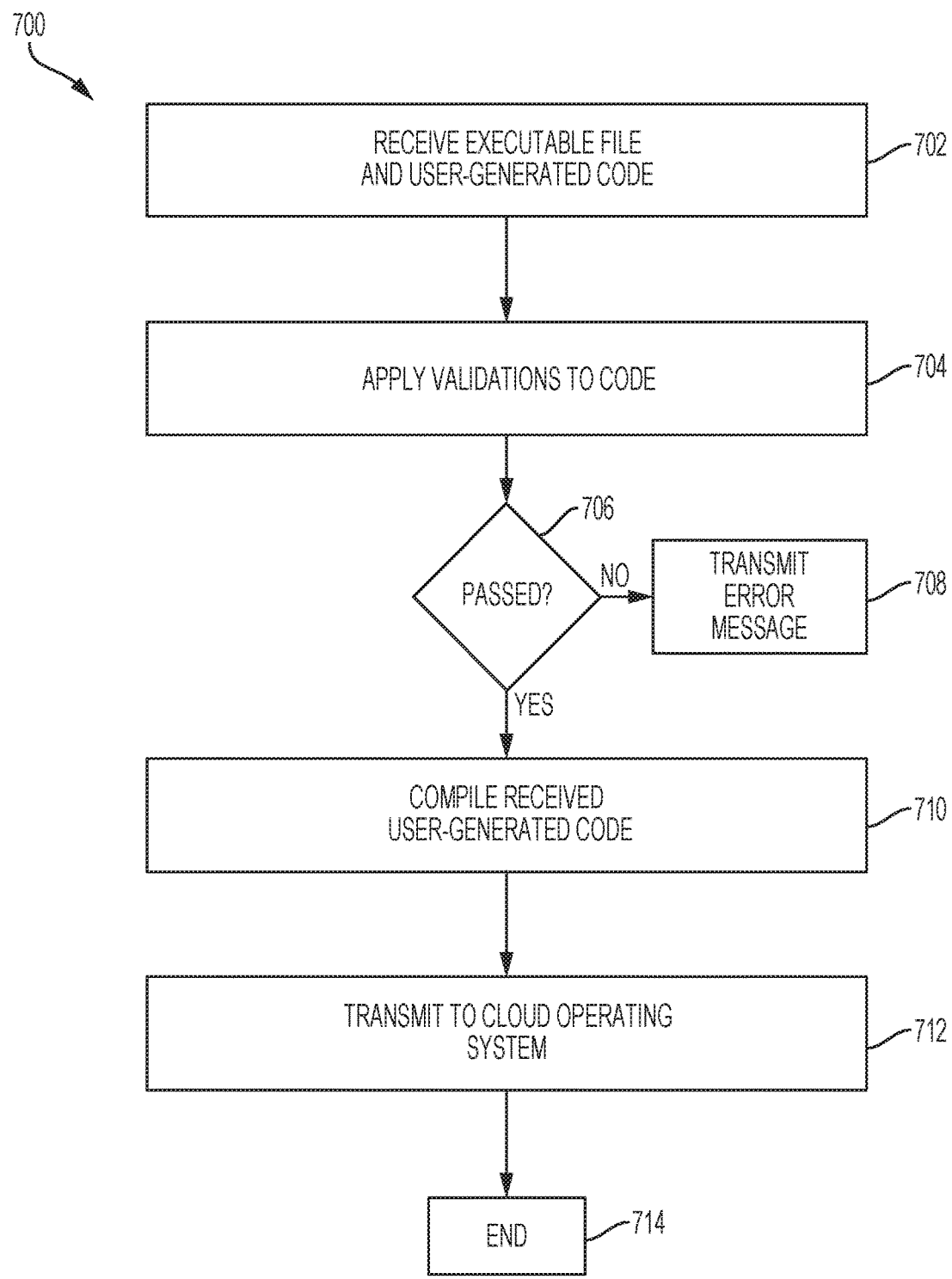
FIG. 7 illustrates an exemplary method of performing cloud operating system verifications of a domain-specific programming language for cloud services infrastructure, according to examples of the disclosure.

FIG. 7 illustrates an exemplary method of performing cloud operating system verifications of a domain-specific programming language for cloud services infrastructure, according to examples of the disclosure. The method 700 can start at step 702 wherein a cloud operating system can receive an executable file and a user-generated source code written in a domain-specific programming language as discussed above. The received executable file can be generated from a compiler that exists on the client's (i.e., user's) personal computer. Once the source-code is compiled, a copy of the user-generated code and the associated executable file generated by the compilation process can be transmitted to and received by a cloud operating system at step 702.

Once the user-generated code and executable file is received at step 702, the method 700 can move to step 704 wherein the code is "validated" by a compiler running on the cloud operating system. As discussed above, validating code generated by a user using a domain-specific programming language can include querying a state information service to obtain state information and determining whether the variables expressed within the user-generated code exist and the declaration of the variables are within the scope of the variable as stored within the state information service. "Validating" the code can also include applying a validations library to the user-generated code so as to audit the code and determine whether or not the user-generated code complies with various computing policies associated with the organization that own the cloud computing environment being operated on.

In this way, rather than depend on the user to perform the requisite validations, instead the organization can ensure that the requisite validations are always being performed on any user-generated code that seeks to operate on the cloud computing environment stored and implement on the cloud service provider.

Once the validations have been performed the process can move to step 706 where it is determined whether the user-generated code has passed the validations performed in step 704. To pass the validations can mean that each and every variable declared in the user-generated code exists, is within scope, and the code in general is in compliance with the organization's computing policies as laid out in the validations library. If the code is determined to not have passed, then the process can move to step 708 wherein an error is transmitted to the user who supplied the user-generated code and the process is terminated. However, if the code is determined to pass validation, then the process can move to step 710 wherein the compiler of the cloud operating system can compile the received user generated code (received at step 702) and generate an executable file that will ultimately be converted into a plurality of commands to be processed by a cloud service provider to implement the desired computing infrastructure.

Once the new executable file is generated at step 710, the process can move to step 712 wherein the executable file can be transmitted further through the cloud operating system for processing so as to implement the desired computing infrastructure. Finally, upon the transmitting the executable file at step 712, the process can move to step 714 wherein the process can be terminated.

As discussed above with respect to FIG. 7, at step 702 the process can begin by receiving both the user-generated code and an executable file generated by a client-side compiler used at the user's client side device. Ostensibly, once a newly generated executable file is generated at step 710, after the user-generated code has been validated, the newly generated executable file should substantially be identical to the executable file generated at the client-side compiler and received at step 702. Since the process outlined in FIG. 7 is only seeking to validate the code, and is not attempting to change the code in any way, the newly generated executable file generated at step 710 should match the executable file received at step 702. However, if the newly generated executable file does not match the received executable file, then the mismatch can serve as evidence that the user-generated code contains some form of malicious code. Thus, as part of the validation process, the cloud operating system compiler can check the newly generated executable file against the client-side generated executable file to determine if there is any suspicious behavior associated with the user-generated code.

Figure 8:
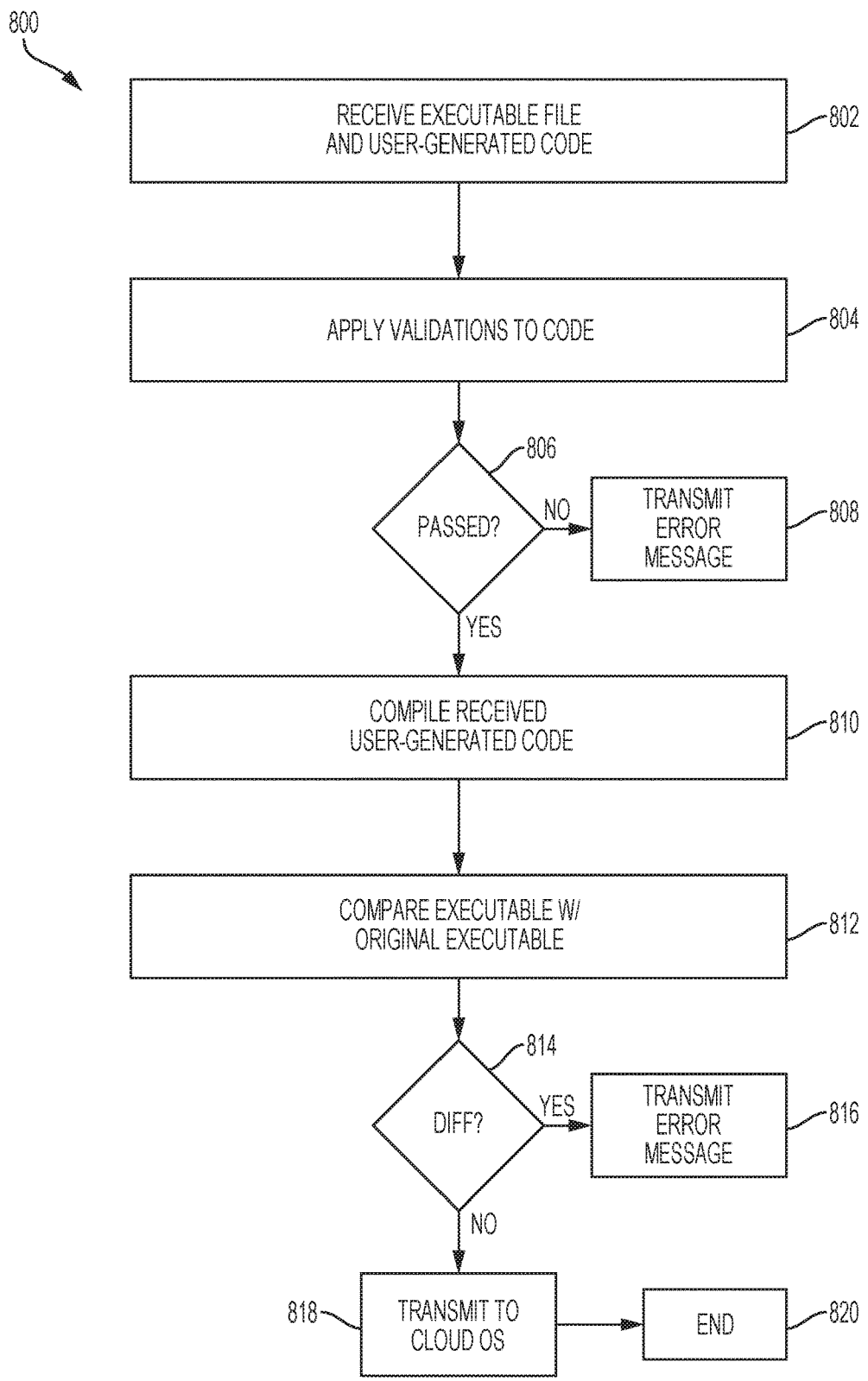
FIG. 8 illustrates another exemplary method of performing cloud operating system verifications of a domain-specific programming language for cloud services infrastructure, according to examples of the disclosure.

FIG. 8 illustrates another exemplary method of performing cloud operating system verifications of a domain-specific programming language for cloud services infrastructure, according to examples of the disclosure. The example of FIG. 8 can include a comparison between the client-side generated executable file and the cloud operating system executable file. The method 800 can proceed substantially identically to the process described with respect to FIG. 7, insofar as steps 802, 804, 806, 808, and 810 are identical to their counterparts 702, 704, 706, 708, and 710 respectively. A full description of those steps can be found above with respect to the discussion of FIG. 7.

Upon completion of step 810 wherein the compiler compiles the received user-generated code, the process can move to step 812 wherein the originally received executable file received from the client device at step 802 can be compared against the executable file generated at step 810. The comparison can include checking to see if each line of the executable file generated at step 810 corresponds to a line of code from the executable file received at step 802. As the validation process does not alter the received user-generated code in any way (the validations process only ensures that each variable in the user-generated code exists and is in scope, and ensures that the code meets the organization's computing policies) it is expected that the executable file generated at step 810 matches nearly verbatim the executable file received at step 802.

At step 814, the method 800 can determine if there are any discrepancies between the executable file generated at step 812 and the executable file received at step 802. If it is determined that any discrepancies exists (indicating suspicious user-generated code) the process can move to step 816 wherein an error message is transmitted to the user, and the process is terminated. However, if no differences are found, then the process can move to step 818 wherein the executable file is sent by the cloud operating system for further processing and conversion to a plurality of commands that when executed by the cloud service provider, can generate the desired computing infrastructure.

In some examples, validations can be conducted on both the client-side and the cloud operating system. By performing the validation process on both the client-side and the cloud operating system, the advantages germane to each validation process can be simultaneously realized. By compiling the user-generated code on the client-side, a user seeking to implement computing infrastructure on a cloud services provider using a domain-specific computing language can quickly determine whether the code they generated is valid, within scope, and meets the computing policies. By compiling the user-generated code on the cloud operating system, an organization can ensure that code being executed on its cloud computing system meets various computing policies and that the code is not being sent to the system for a malicious purpose or intent.

Figure 9:
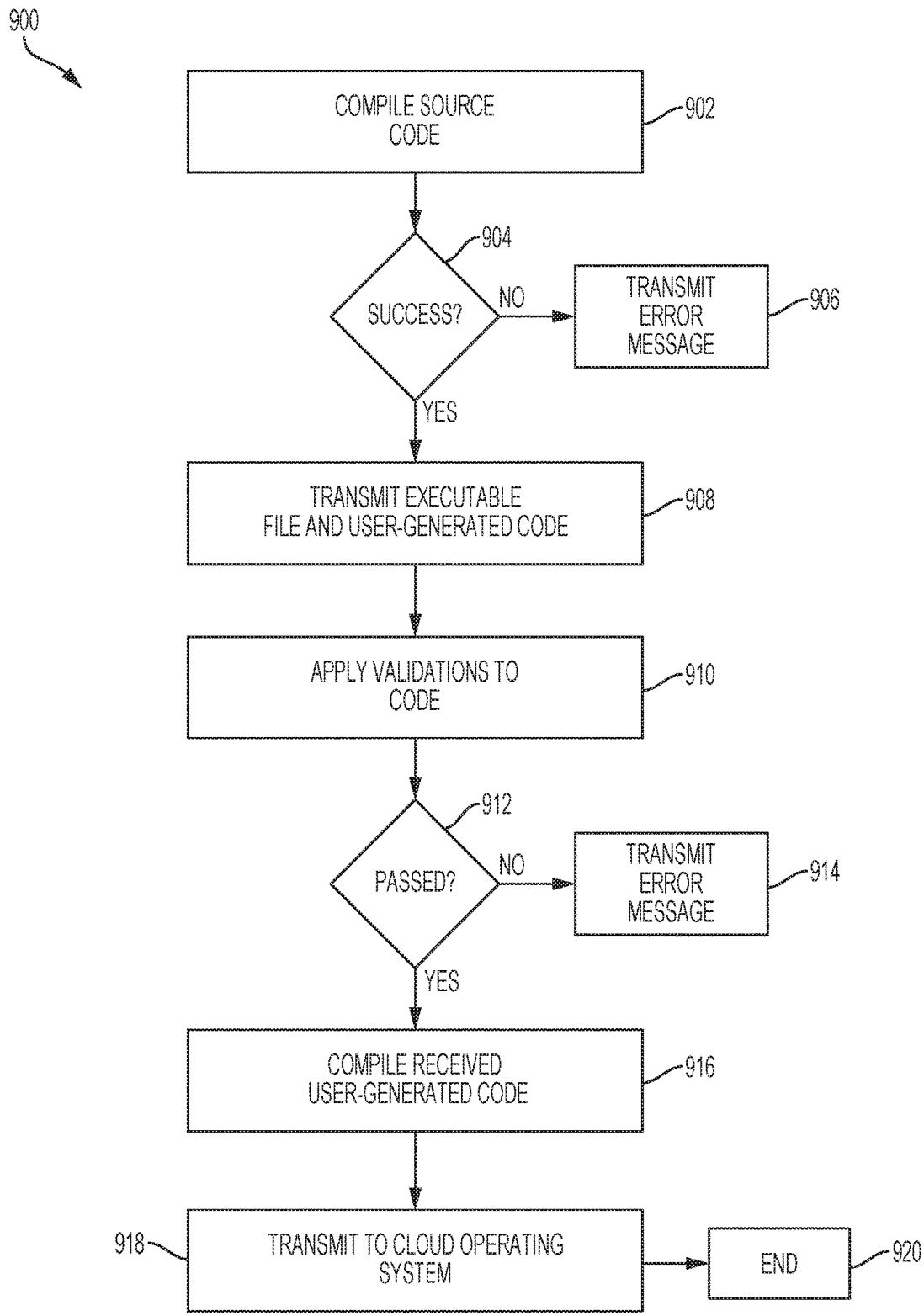
FIG. 9 illustrates an exemplary method of performing both client side and cloud operating system verifications of a domain-specific programming language for cloud service infrastructure, according to examples of the disclosure.

FIG. 9 illustrates an exemplary method of performing both client side and cloud operating system verifications of a domain-specific programming language for cloud service infrastructure, according to examples of the disclosure. The method 900 can begin at step 902 wherein the user-generated domain-specific code can be compiled as described above at the client-side (i.e., each variable is determined to be valid and in scope, and the code as whole is validated against an organization's policies using an included validations library as discussed above). At step 904, the process can determine if the code successfully compiled at step 902. If the code did not successfully compile, the process can move to step 906 wherein an error message can be transmitted to a user.

If however, the code successfully compiles, the process can move to step 908 wherein the executable file generated by the client-side compiler, and the user-generated code on which the generated executable file is based upon can be transmitted from the client computer to the cloud operating system.

Once the user-generated code and executable file is received at step 908, the method 900 can move to step 910 wherein the code is "validated" by a compiler running on the cloud operating system. As discussed above, validating code generated by a user using a domain-specific programming language can include querying a state information service to obtain state information and determining whether the variables expressed within the user-generated code exist and the declaration of the variables are within the scope of the variable as stored within the state information service. "Validating" the code can also include applying a validations library to the user-generated code so as to audit the code and determine whether or not the user-generated code complies with various computing policies associated with the organization that own the cloud computing environment being operated on.

In this way, rather than depend on the user to perform the requisite validations, instead the organization can ensure that the requisite validations are always being performed on any user-generated code that seeks to operate on the cloud computing environment stored and implement on the cloud service provider.

Once the validations have been performed the process can move to step 912 where it is determined whether the user-generated code has passed the validations performed in step 910. If the code is determined to not have passed, then the process can move to step 914 wherein an error is transmitted to the user who supplied the user-generated code and the process is terminated. However, if the code is determined to pass validation, then the process can move to step 916 wherein the compiler of the cloud operating system can compile the received user generated code (received at step 908) and generate an executable file that will ultimately be converted into a plurality of commands to be processed by a cloud service provider to implement the desired computing infrastructure.

Once the new executable file is generated at step 916, the process can move to step 918 wherein the executable file can be transmitted further through the cloud operating system for processing so as to implement the desired computing infrastructure. Finally, upon the transmitting the executable file at step 918, the process can move to step 920 wherein the process can be terminated.

Figure 10:
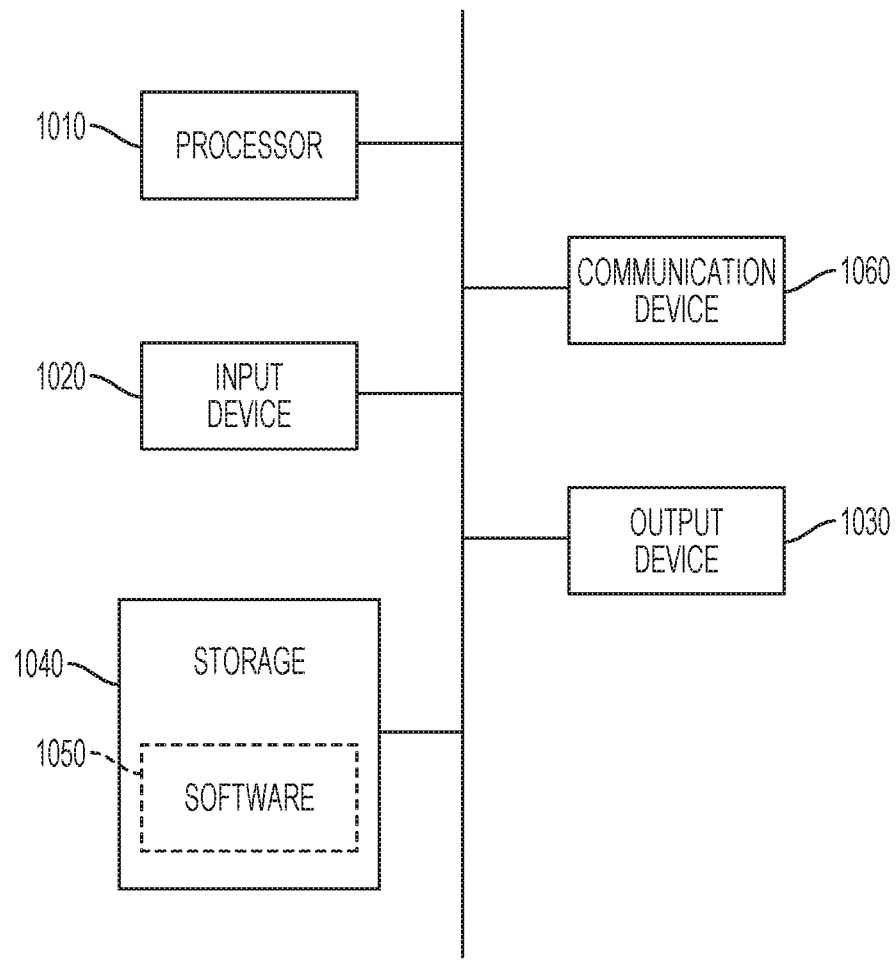
FIG. 10 illustrates an exemplary computing system according to examples of the disclosure.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1000 can implement any operating system suitable for operating on the network. Software 1050 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for building computing infrastructure on a cloud computing environment, the method comprising:
receiving one or more user-generated files of code written in a domain-specific programming language, wherein the one or more files of code comprise one or more definitions of one or more instances of computing infrastructure to be built in the cloud computing environment, and wherein the one or more files of code contain one or more declarations of policy relating to the computing infrastructure, wherein the received one or more files written in the domain-specific programming language include one or more variables, each variable corresponding to and defining an instance of computing infrastructure of the one or more instances of computing infrastructure to be built in the cloud computing environment;
querying a state information service to determine whether each instance of computing infrastructure corresponding to a variable exists in the state information service and to determine whether the each variable is in scope with its corresponding instance of computing infrastructure;
determining if each of the one or more instances of computing infrastructure to be built in the cloud computing environment is in compliance with the one or more declarations of policy received in the one or more files of code;
converting the one or more variables received in the one or more files of code into one or more instructions readable by a command line interface of the cloud computing environment if each instance of computing infrastructure corresponding to a variable of the one or more variables are found to exist in the state information service, each variable is in scope with its corresponding instance of computing infrastructure, and if each instance of computing infrastructure to be built in the cloud computing environment is in compliance with the one or more declarations of policy received in the one or more files of code; and
transmitting a message depending upon whether an instance of the one or more instances of computing infrastructure to be built in the cloud computing environment is found to not be in compliance with the one or more declarations of policy received in the one or more files of code.

2. The method of claim 1, wherein determining if the received code is in compliance with one or more policies includes executing a validation function associated with a type found in the received code.

3. The method of claim 2, wherein the validation function is stored in one or more libraries and wherein the one or more libraries are imported into the received code.

4. The method of claim 1, wherein the method further comprises generating an implementation plan if each variable of the one or more variables is found to exist in the state information service and be in scope with the identified one or more instances of computing infrastructure.

5. The method of claim 4, wherein the method further comprises transmitting the generated implementation plan to the user for approval.

6. The method of claim 5, wherein the method further comprises implementing the code written by the user in the domain-specific programming language on the cloud computing environment if the user approves of the generated implementation plan.

7. The method of claim 6, wherein implementing the code includes converting the source-code into an intermediate representation that is compatible with a command line interface of a cloud infrastructure operating system.

8. The method of claim 7, wherein implementing the code includes modifying the one or more instructions readable by a command line interface of the cloud computing environment such that an implemented one or more instances of computing infrastructure corresponds to the code.

9. The method of claim 1, wherein the received code includes one or more functions that utilize the one or more variables associated with the one or more instances of computing infrastructure to be built on a cloud computing environment.

10. The method of claim 1, wherein the one or more variables include user defined instances of computing infrastructure to be built on the cloud computing environment.

11. The method of claim 1, wherein determining if the received code is in compliance with one or more policies is carried out on a client-computer used to generate the code.

12. A non-transitory computer readable storage medium storing one or more programs, the one or more programs comprising instructions building infrastructure on a cloud computing system, which when executed by a portable electronic device, cause the device to:
receive one or more user-generated files of code written in a domain-specific programming language, wherein the one or more files of code comprise one or more definitions of one or more instances of computing infrastructure to be built in the cloud computing environment, and wherein the one or more files of code contain one or more declarations of policy relating to the computing infrastructure, wherein the received one or more files written in the domain-specific programming language include one or more variables, each variable corresponding to and defining an instance of computing infrastructure of the one or more instances of computing infrastructure to be built in the cloud computing environment;
query a state information service to determine whether each instance of computing infrastructure corresponding to a variable exists in the state information service and to determine whether the each variable is in scope with its corresponding instance of computing infrastructure;
determine if each of the one or more instances of computing infrastructure to be built in the cloud computing environment is in compliance with the one or more declarations of policy received in the one or more files of code;
convert the one or more variables received in the one or more files of code into one or more instructions readable by a command line interface of the cloud computing environment if each instance of computing infrastructure corresponding to a variable of the one or more variables are found to exist in the state information service, each variable is in scope with its corresponding instance of computing infrastructure, and if each instance of computing infrastructure to be built in the cloud computing environment is in compliance with the one or more declarations of policy received in the one or more files of code; and
transmit a message depending upon whether an instance of the one or more instances of computing infrastructure to be built in the cloud computing environment is found to not be in compliance with the one or more declarations of policy received in the one or more files of code.

13. The non-transitory computer readable medium of claim 12, wherein determining if the received code is in compliance with one or more policies includes executing a validation function associated with a type found in the received code.

14. The non-transitory computer readable medium of claim 13, wherein the validation function is stored in one or more libraries and wherein the one or more libraries are imported into the received code.

15. The non-transitory computer readable medium of claim 12, wherein the device is further caused to generate an implementation plan if each variable of the one or more variables is found to exist in the state information service and be in scope with the identified one or more instances of computing infrastructure.

16. The non-transitory computer readable medium of claim 15, wherein the device is further caused to transmit the generated implementation plan to the user for approval.

17. The non-transitory computer readable medium of claim 16, wherein the device is further caused to implement the code written by the user in the domain-specific programming language on the cloud computing environment if the user approves of the generated implementation plan.

18. The non-transitory computer readable medium of claim 17, wherein implementing the code includes converting the source-code into an intermediate representation that is compatible with a command line interface of a cloud infrastructure operating system.

19. The non-transitory computer readable medium of claim 18, wherein implementing the code includes modifying the one or more instructions readable by a command line interface of the cloud computing environment such that an implemented one or more instances of computing infrastructure corresponds to the code.

20. The non-transitory computer readable medium of claim 12, wherein the received code includes one or more functions that utilize the one or more variables associated with the one or more instances of computing infrastructure to be built on a cloud computing environment.

21. The non-transitory computer readable medium of claim 12, wherein the one or more variables include user defined instances of computing infrastructure to be built on the cloud computing environment.

22. The non-transitory computer readable medium of claim 12, wherein determining if the received code is in compliance with one or more policies is carried out on a client-computer used to generate the code.

* * * * *